United States Patent [19]
Tobia

[11] Patent Number: 5,560,116
[45] Date of Patent: Oct. 1, 1996

[54] FLEXIBLE LEVELING DEVICE

[76] Inventor: Frank Tobia, 1067 SW. 92nd Ave., Plantation, Fla. 33324

[21] Appl. No.: 441,599

[22] Filed: May 15, 1995

[51] Int. Cl.$^6$ .................................................. G01C 9/18
[52] U.S. Cl. ........................... 33/365; 33/451; 33/561.2
[58] Field of Search .......................... 33/365, 347, 370, 33/371, 372, 373, 374, 451, 561.2, 562, 376

[56] References Cited

U.S. PATENT DOCUMENTS

| | | |
|---|---|---|
| D. 184,608 | 3/1959 | De Fano . |
| 950,199 | 2/1910 | Young . |
| 1,111,677 | 9/1914 | Schade ........................................ 33/370 |
| 1,153,760 | 9/1915 | Butler .......................................... 33/370 |
| 1,229,916 | 6/1917 | Duncan ....................................... 33/370 |
| 2,559,961 | 7/1951 | Howell ........................................ 33/374 |
| 2,570,430 | 10/1951 | Cramer ........................................ 33/370 |
| 3,057,250 | 10/1962 | Griffith ........................................ 33/372 |
| 3,180,036 | 4/1965 | Meeks, Sr. ................................... 33/347 |
| 3,269,729 | 8/1966 | Morrison . |
| 3,383,772 | 5/1968 | Gardner et al. . |
| 3,589,021 | 6/1971 | Hall, Sr. ...................................... 33/372 |
| 3,707,772 | 1/1973 | Cotter .......................................... 33/373 |
| 3,728,796 | 4/1973 | Lobaugh ..................................... 33/371 |
| 4,070,764 | 1/1978 | Rohlinger ................................... 33/376 |
| 4,100,681 | 7/1978 | Hollander ................................... 33/347 |
| 4,565,012 | 1/1986 | Bilodeau et al. ........................... 33/483 |
| 4,578,989 | 4/1986 | Scott ........................................... 33/451 |
| 4,663,856 | 5/1987 | Hall et al. ................................... 33/373 |
| 4,928,395 | 5/1990 | Good .......................................... 33/374 |
| 5,450,677 | 9/1995 | Casey .......................................... 33/373 |

Primary Examiner—Christopher W. Fulton
Attorney, Agent, or Firm—Clifford L. Tager. Esq.

[57] ABSTRACT

The present invention is directed to a flexible leveling device for use on curved surfaces. The flexible leveling device comprises an elongated rectangular body having a longitudinal axis and being capable of at least 360° flexion about its longitudinal axis. A first spirit level is operatively connected to the elongated body. A holder preferably secures the spirit level to the elongated rectangular body, allowing the spirit level to remain substantially in position during flexion of the elongated body. The holder preferably comprises a first portion operatively connected to the rectangular body, with the spirit level operatively connected to the second portion of the holder. The elongated rectangular body preferably further comprises a first projection located near the first terminal edge, and a second projection located near the second terminal edge. The projections facilitate placement of the flexible leveling device. The flexible leveling device preferably further comprises a device to secure the rectangular body about a curved structure. In one embodiment, the securing device comprises an adjustable strap connectable between the first and the second projections to secure the rectangular body about the curved structure. In another embodiment, the elongated rectangular body comprises a first slot located near its first terminal edge and a second slot located near its second terminal edge. The securing device comprises an adjustable strap placeable within the first and the second slots to secure the rectangular body about the curved structure.

24 Claims, 2 Drawing Sheets

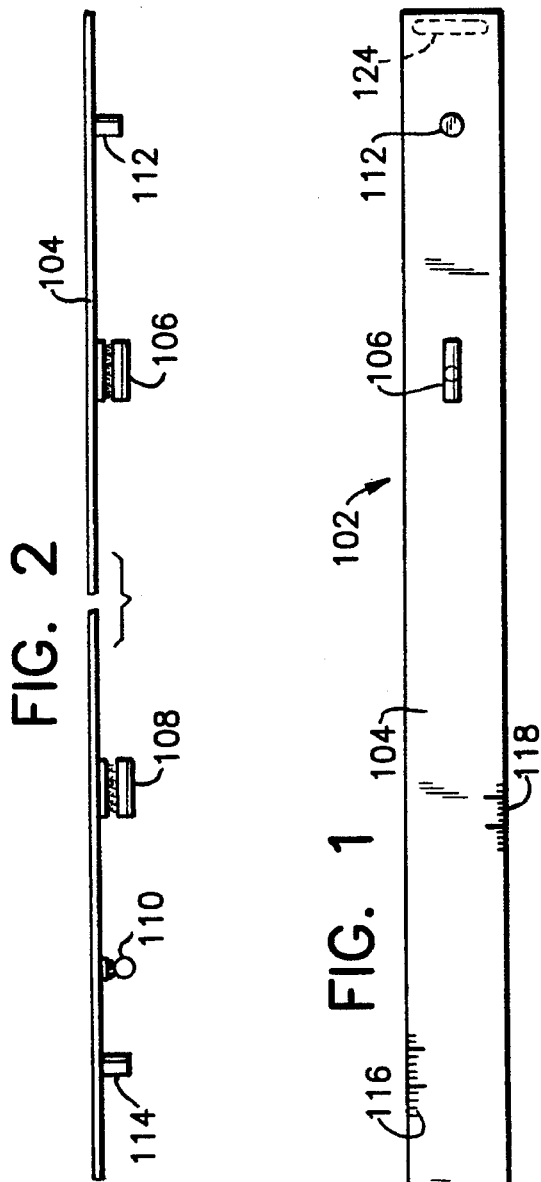
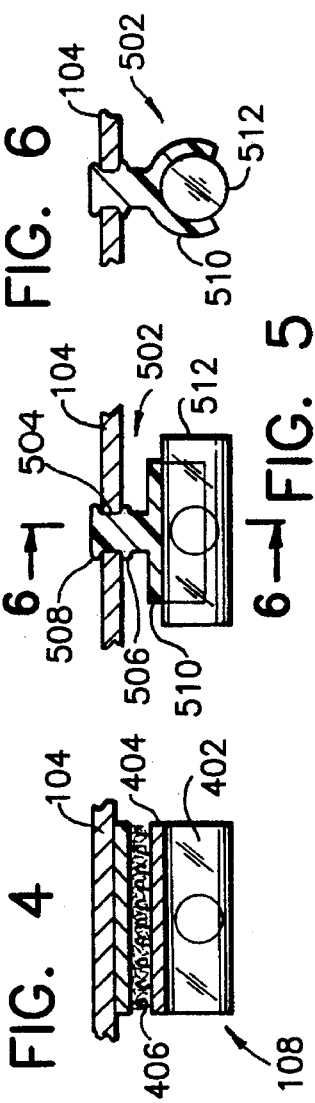
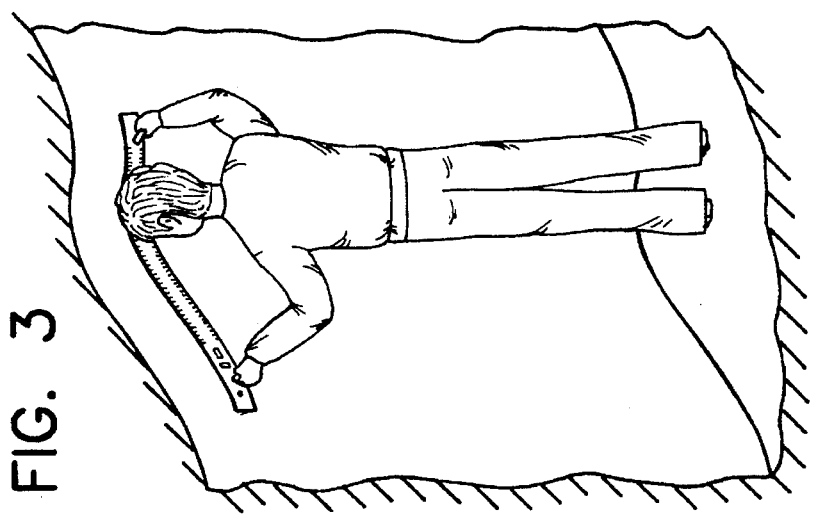
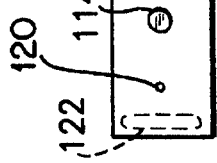

FLEXIBLE LEVELING DEVICE

BACKGROUND OF THE INVENTION

1. Technical Field

The present invention is directed to a leveling device. More particularly, the present invention is directed to a flexible leveling device capable of at least 360° of flexion.

The present invention finds particular utility for indicating and/or marking relative horizontal and/or vertical positioning on curved surfaces, such as curved walls, columns, beams and other curved structures.

2. Background Information

A leveling device is a tool which is well known in the art, and is typically employed to indicate whether a given surface is either parallel or perpendicular to horizontal. Typically, a prior art leveling device comprises an elongated body having a first spirit level attached thereto and aligned with the longitudinal axis of the elongated body. A second spirit level is often also attached thereto and aligned with an axis which is perpendicular to the longitudinal axis of the elongated body.

In use, the prior art leveling device is placed on or against a surface of a structure to indicate whether the surface thereof is substantially horizontal or vertical. Where the surface of the structure is horizontal, the air bubble located in the fluid of the first spirit level rests in the center portion thereof. Where the surface of the structure is vertical, the air bubble located in the fluid of the second spirit level rests in the center portion thereof.

Prior art leveling devices are typically employed to indicate whether the surface of the structure is substantially horizontal or vertical and, if not, to adjust the positioning of the structure until the structure is in the desired relative position.

Prior art leveling devices are also typically employed to mark relative horizontal or vertical positioning, thereby establishing a reference line which can be used, e.g., as a guide when laying out ceramic files.

To minimize any measurement error of the leveling device itself, the elongated body of prior art leveling devices is typically rigid, thereby assuring true juxtaposition to the surface of the structure to be measured.

While a rigid body is satisfactory for measuring surfaces which are substantially flat, the rigid body makes prior art leveling devices impractical for indicating and/or marking horizontal or vertical positioning on curved surfaces.

Accordingly, there is need for a leveling device which can be employed on curved surfaces to indicate and/or mark horizontal or vertical positioning.

SUMMARY OF THE INVENTION

The present invention is directed to a flexible leveling device for use on curved surfaces. The flexible leveling device preferably comprises an elongated rectangular body having a longitudinal axis. The elongated body is capable of at least 360° flexion about its longitudinal axis, thereby allowing it to be used on curved surfaces.

A first spirit level is operatively connected to the elongated body to indicate rotation relative to the longitudinal axis of the rectangular body. The flexible leveling device optionally includes a second spirit level.

In a preferred embodiment, the present invention also comprises a holder to secure the spirit level to the elongated rectangular body. The holder preferably allows the spirit level to remain substantially in position during flexion of the elongated body.

The holder preferably comprises a first and a second portion, the first portion being operatively connected to the rectangular body and the spirit level being operatively connected to the second portion of the holder.

The second portion of the holder preferably comprises an elongated surface having a contour which is substantially the mirror image of a predetermined portion of the spirit level. The predetermined portion of the spirit level is operatively connected to the elongated surface of the holder. Alternatively, the second portion of the holder comprises an opening therein, the spirit level being operatively housed within the opening.

The rectangular body preferably also comprises a first and a second longitudinal edge substantially parallel to the longitudinal axis. Ruler indication markings are preferably located substantially near one or both of the longitudinal edges to indicate distance. The ruler indication markings could be in US standard scale and/or a metric scale.

The elongated rectangular body of the flexible leveling device preferably further comprises a first and a second terminal edge, a first projection located near the first terminal edge, and a second projection located near the second terminal edge. The projections facilitate placement of the flexible leveling device. For example, the projections act as handles by which a user may hold the flexible leveling device against a surface, such as a curved wall.

The flexible leveling device preferably further comprises a device to secure the rectangular body about a curved structure. In one embodiment, the device to secure the rectangular body about a curved structure preferably comprises an adjustable strap connectable between the first and the second projections to secure the rectangular body about the curved structure.

In another embodiment, the elongated rectangular body comprises a first slot located near its first terminal edge and a second slot located near its second terminal edge. The device to secure the rectangular body about a curved structure preferably comprises an adjustable strap placeable within the first and the second slots to secure the rectangular body about the curved structure.

BRIEF DESCRIPTION OF THE DRAWINGS

FIG. 1 is a front view of the flexible leveling device of the present invention.

FIG. 2 is a top view of the flexible leveling device of the present invention shown in FIG. 1.

FIG. 3 illustrates the flexible leveling device shown in FIG. 1 used on a curved wall.

FIG. 4 is a cross-sectional view of the leveling device of the present invention taken at lines 4—4 shown in FIG. 1.

FIG. 5 is an isolated view of an embodiment for attaching a spirit level to the elongated rectangular body of the flexible leveling device shown in to FIG. 1.

FIG. 6 is a cross-sectional view taken at lines 6—6 shown in FIG. 5.

DESCRIPTION OF THE PREFERRED EMBODIMENT(S)

Figure 7:
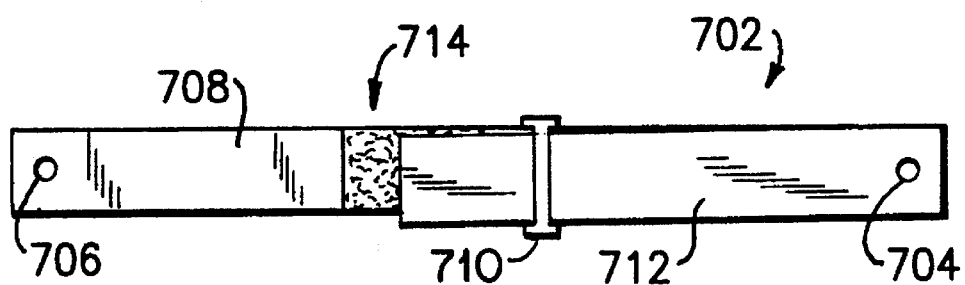
FIG. 7 depicts an embodiment of a strap for securing the flexible leveling device in FIG. 1 about a column or other curved structure.

Turning now to FIGS. 1 and 2, a front and top view, respectively, of the flexible leveling device of the present invention is shown. Leveling device 102 preferably comprises elongated rectangular body 104, spirit levels 106, 108 and 110, projections 112 and 114, ruler indication markings 116 and 118, hanging hole 120, and optional slots 122 and 124.

Elongated rectangular body 104 is capable of 360° flexion about its longitudinal axis, allowing the leveling device to be used on curved surfaces, such as curved walls (see, e.g., FIG. 3), columns, beams and other curved structures.

The elongated rectangular body can be manufactured from any material which permits longitudinal flexibility, such as rubber or leather. In the preferred embodiment, the elongated rectangular body is manufactured from stainless steel, thereby preventing deterioration from moisture, as well as minimizing damage from extended usage at construction sites.

Spirit levels 106 and 108 are preferably aligned with the longitudinal axis of the elongated body, thereby being capable of indicating horizontal positioning. Spirit level 110 is preferably aligned with the axis perpendicular to the longitudinal axis of the elongated body, thereby being capable of indicating vertical positioning.

Spirit levels 106, 108 and 110 are preferably tubular levels having a fluid of contrasting color contained therein. Two horizontal and one vertical tubular spirit levels are depicted. However, it will be understood that the flexible leveling device can have any number or type of spirit levels attached thereto, positioned in any desired manner for indicating horizontal, vertical or any other angular measurement.

The spirit levels are preferably attached to the elongated rectangular body in such fashion to allow the spirit levels to remain substantially in their respective positions during flexion of the elongated body.

FIG. 4 is a cross-sectional view of the leveling device of the present invention taken at lines 4—4 shown in FIG. 1, and illustrates a preferred embodiment for attaching spirit level 108 to elongated rectangular body 104.

As shown with reference to FIG. 4, spirit level 108 comprises tubular enclosure 402 attached to rigid backing 404. A preferred embodiment for attaching spirit level 108 to elongated rectangular body 104 is via two-sided mounting tape 406 attached between elongated rectangular body 104 and backing 404 of spirit level 108. Where spirit level 108 does not comprise a backing, such as backing 404, mounting tape 406 is attached directly to a portion of the spirit level.

Mounting tape 406 is preferably of sufficient thickness to allow the spirit level to remain substantially in position during flexion of the elongated rectangular body. In the preferred embodiment, the thickness of the mounting tape is about 0.125 inches.

Another preferred embodiment for attaching a spirit level to the elongated rectangular body is shown with reference to FIG. 5, which depicts holder 502 having a shaft, a first end of which is attached to the elongated rectangular body through hole 504.

In the preferred embodiment, the shaft of holder 502 includes first annular projection 506, which is positioned against one side of the elongated rectangular body. One end of the shaft preferably terminates in second annular projection 508 positioned against the opposite side of the elongated rectangular body. Projections 506 and 508 retain the shaft, and thus the holder, in position during flexion of the elongated rectangular body.

The second end of the shaft of holder 502 preferably secures elongated surface 510 thereto, which secures tubular spirit level 512 therein, as shown in more detail with reference to FIG. 6, which depicts a cross-sectional view of the holder taken at section lines 6—6 of FIG. 5.

The holder can be manufactured from any suitable material. In the preferred embodiment, the holder is manufactured from plastic, allowing projections 506 and 508 to be easily formed and projection 508 to be easily trimmed to minimize the discontinuity with the back surface of the elongated rectangular body.

Alternatively, the shaft of the holder can be a stainless steel pin, wedged or otherwise secured in hole 504. Provided elongated surface 510 secures spirit level 512, various alternative embodiments therefor will also be obvious to those skilled in the art.

Returning to FIG. 1, the flexible leveling device of the present invention preferably also includes projections 112 and 114. The projections facilitate placement of the flexible leveling device. For example, the projections act as handles by which a user may hold the flexible leveling device against a surface, such as a curved wall shown with reference to FIG. 3.

The projections can also be employed to facilitate the placement of the flexible leveling device about a column or other curved structure.

FIG. 7 depicts an embodiment of a strap for securing the flexible leveling device about a column or other curved structure via projections 112 and 114 (FIG. 1). With reference to FIG. 7, adjustable strap 702 preferably comprises holes 704 and 706 into which projections 112 and 114 (FIG. 1), respectively, can be placed for securing the flexible leveling device about a column or other curved structure.

Strap 702 is preferably adjustable via inserting first strap 708 through ring 7 10, which is secured to second strap 712. The length of first strap 708 is preferably adjustable via self-adhering material 714 preferably comprises a hook and rug arrangement, such as sold under the trademark VEL-CRO®. It will be appreciated that the strap can alternatively have other self-adjusting mechanisms.

While projections 112 and 114 are illustrated as straight projections, it will be appreciated that the projections can alternatively have any shape or design, both for use as a handle and/or for securing strap 702 thereto.

Figure 8:
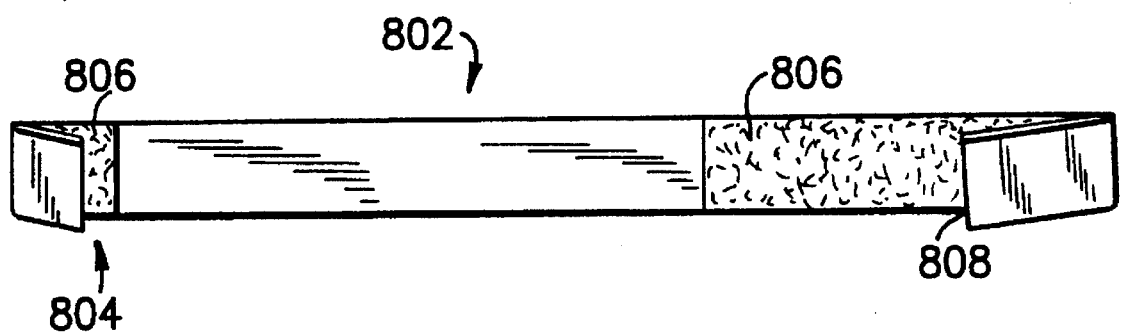
FIG. 8 depicts another embodiment of a strap for securing the flexible leveling device in FIG. 1 about a column or other curved structure.

FIG. 8 depicts another embodiment of a strap for securing the flexible leveling device about a column or other curved structure. With reference to FIG. 8, portion 804 of strap 802 preferably attaches to the flexible leveling device through optional slot 122 (FIG. 1 ).

In the preferred embodiment, portion 804 of strap 802 is detachably connected to slot 122 (FIG. 1 ) via self-adhering material 806, which preferably comprises a hook and rug arrangement, such as sold under the trademark VELCRO®. It will be appreciated that the strap can alternatively have other connecting mechanisms. Alternatively, portion 804 of strap 802 can be permanently attached to slot 122 (FIG. 1 ) of the flexible leveling device.

To secure the flexible leveling device about a column or other curved structure, terminal end 808 of strap 802 is locatable through optional slot 124 (FIG. 1), and preferably adjusts via self-adhering material 806, as above.

It will be appreciated that alternative embodiments are available for securing the flexible leveling device about a column or other curved structure, including but not limited to two separate straps, each independently securable to the flexible leveling device via slots 122 and 124, respectively.

Returning to FIG. 1, the flexible leveling device of the present invention preferably also includes ruler indication markings 116 and 118. The ruler indication makings may be scaled in any number of increments per unit (e.g., χ markings per unit), scaled to accommodate a specific task (e.g., one marking every 4 inches to facilitate the laying of ceramic tiles) and/or scaled in any system of measurement (e.g., metric or U.S. scale). In the preferred embodiment, ruler indication marking 116 is in U.S. scale, 8 gradations per inch, and ruler indication marking 118 is in metric scale, 10 millimeters per centimeter.

The flexible leveling device of the present invention preferably also includes hole 120 to allow the device to hang, e.g., by a nail, when not in use.

In the preferred embodiment, the elongated rectangular body has an overall length of about 4 feet, a width of about 3.5 inches, and is manufactured from 22 gauge stainless steel.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A flexible leveling device for use on a curved surface, said flexible leveling device comprising:

an elongated rectangular body having a longitudinal axis, the elongated body having a normally planar surface which is substantially capable of continuous flexion about its longitudinal axis, thereby allowing at least a substantial portion of the elongated rectangular body to contact the curved surface; and a first spirit level operatively attached to the rectangular body, the first spirit level being capable of indicating whether the longitudinal axis of the rectangular body is substantially parallel to a predetermined reference line.

2. The flexible leveling device of claim 1, said device further comprising:

a second spirit level operatively attached to the rectangular body.

3. The flexible leveling device of claim 1, said elongated rectangular body further comprising:

a first and a second longitudinal edge substantially parallel to the longitudinal axis; and ruler indication markings substantially near the first longitudinal edge to indicate distance.

4. The flexible leveling device of claim 1, said elongated rectangular body further comprising a first and a second terminal edge, said flexible leveling device further comprising:

a first projection operatively connected to the elongated rectangular body near the first terminal edge thereof; and a second projection operatively connected to the elongated rectangular body near the second terminal edge thereof.

5. The flexible leveling device of claim 1, said flexible leveling device further comprising a device to secure the rectangular body about at least a portion of the curved surface.

6. The flexible leveling device of claim 5, said elongated rectangular body further comprising a first and a second terminal edge, wherein said device to secure the rectangular body about a curved surface comprises:

a first projection operatively connected to the elongated rectangular body near the first terminal edge thereof;

a second projection operatively connected to the elongated rectangular body near the second terminal edge thereof; and an adjustable strap connectable between the first and the second projections to secure the rectangular body about the curved surface.

7. The flexible leveling device of claim 5, said elongated rectangular body further comprising a first and a second terminal edge, wherein said device to secure the rectangular body about a curved surface comprises:

a first slot located on the elongated rectangular body near the first terminal edge thereof;

a second slot located on the elongated rectangular body near the second terminal edge thereof; and an adjustable strap placeable within the first and the second slots to secure the rectangular body about the curved surface.

8. The flexible leveling device of claim 1, said flexible leveling device further comprising:

a holder having a first and a second portion, the first portion operatively connected to the rectangular body; and the first spirit level operatively connected to the second portion of the holder.

9. The flexible leveling device of claim 8, wherein the holder allows the first spirit level to remain substantially in position during flexion of the elongated body.

10. The flexible leveling device of claim 8, wherein the second portion of the holder comprises an elongated surface having a contour which is substantially the mirror image of a predetermined portion of the first spirit level, and wherein the predetermined portion of the first spirit level is operatively connected to the elongated surface of the holder.

11. The flexible leveling device of claim 8, wherein the second portion of the holder comprises an opening therein, wherein the spirit level is operatively housed within the opening.

12. The flexible leveling device of claim 1, wherein said elongated rectangular body is substantially capable of continuous flexion of at least 360° about its longitudinal axis.

13. The flexible leveling device of claim 1, wherein the first spirit level is offset from the surface of the rectangular body.

14. A flexible leveling device for use on a curved surface said flexible leveling device comprising:

an elongated rectangular body having a longitudinal axis and a first and a second longitudinal edge substantially parallel to the longitudinal axis, the elongated body having a normally planar surface which is substantially capable of continuous flexion about its longitudinal axis, thereby allowing at least a substantial portion of the elongated rectangular body to contact the curved surface;

a holder having a first and a second portion, the first portion operatively connected to the rectangular body; and a spirit level operatively connected to the second portion of the holder, the spirit level being capable of indicating whether the longitudinal axis of the rectangular body is substantially parallel to a predetermined reference line.

15. The flexible leveling device of claim 14, said elongated rectangular body further comprising ruler indication markings substantially near the first longitudinal edge to indicate distance.

16. The flexible leveling device of claim 14, said elongated rectangular body further comprising a first and a second terminal edge, said flexible leveling device further comprising:

a first projection operatively connected to the elongated rectangular body near the first terminal edge thereof; and a second projection operatively connected to the elongated rectangular body near the second terminal edge thereof.

17. The flexible leveling device of claim 14, said flexible leveling device further comprising a device to secure the rectangular body about at least a portion of the curved surface.

18. The flexible leveling device of claim 17, said elongated rectangular body further comprising a first and a second terminal edge, wherein said device to secure the rectangular body about a curved surface comprises:

a first projection operatively connected to the elongated rectangular body near the first terminal edge thereof;

a second projection operatively connected to the elongated rectangular body near the second terminal edge thereof; and an adjustable strap connectable between the first and the second projections to secure the rectangular body about the curved surface.

19. The flexible leveling device of claim 17, said elongated rectangular body further comprising a first and a second terminal edge, wherein said device to secure the rectangular body about a curved surface comprises:

a first slot located on the elongated rectangular body near the first terminal edge thereof;

a second slot located on the elongated rectangular body near the second terminal edge thereof; and an adjustable strap placeable within the first and the second slots to secure the rectangular body about the curved surface.

20. The flexible leveling device of claim 14, wherein the holder allows the spirit level to remain substantially in position during flexion of the elongated body.

21. The flexible leveling device of claim 14, wherein the second portion of the holder comprises an elongated surface having a contour which is substantially the mirror image of a predetermined portion of the spirit level, and wherein the predetermined portion of the spirit level is operatively connected to the elongated surface of the holder.

22. The flexible leveling device of claim 14, wherein the second portion of the holder comprises an opening therein, wherein the spirit level is operatively housed within the opening.

23. The flexible leveling device of claim 14, wherein said elongated rectangular body is substantially capable of continuous flexion of at least 360° about its longitudinal axis.

24. The flexible leveling device of claim 14, wherein the second portion of the holder is offset from the surface of the rectangular body.

* * * * *